June 27, 1967  R. C. RIKE  3,327,804
VEHICLE BRAKE ACTUATING ASSEMBLY AND FLOORBOARD ARRANGEMENT
Filed Oct. 11, 1965
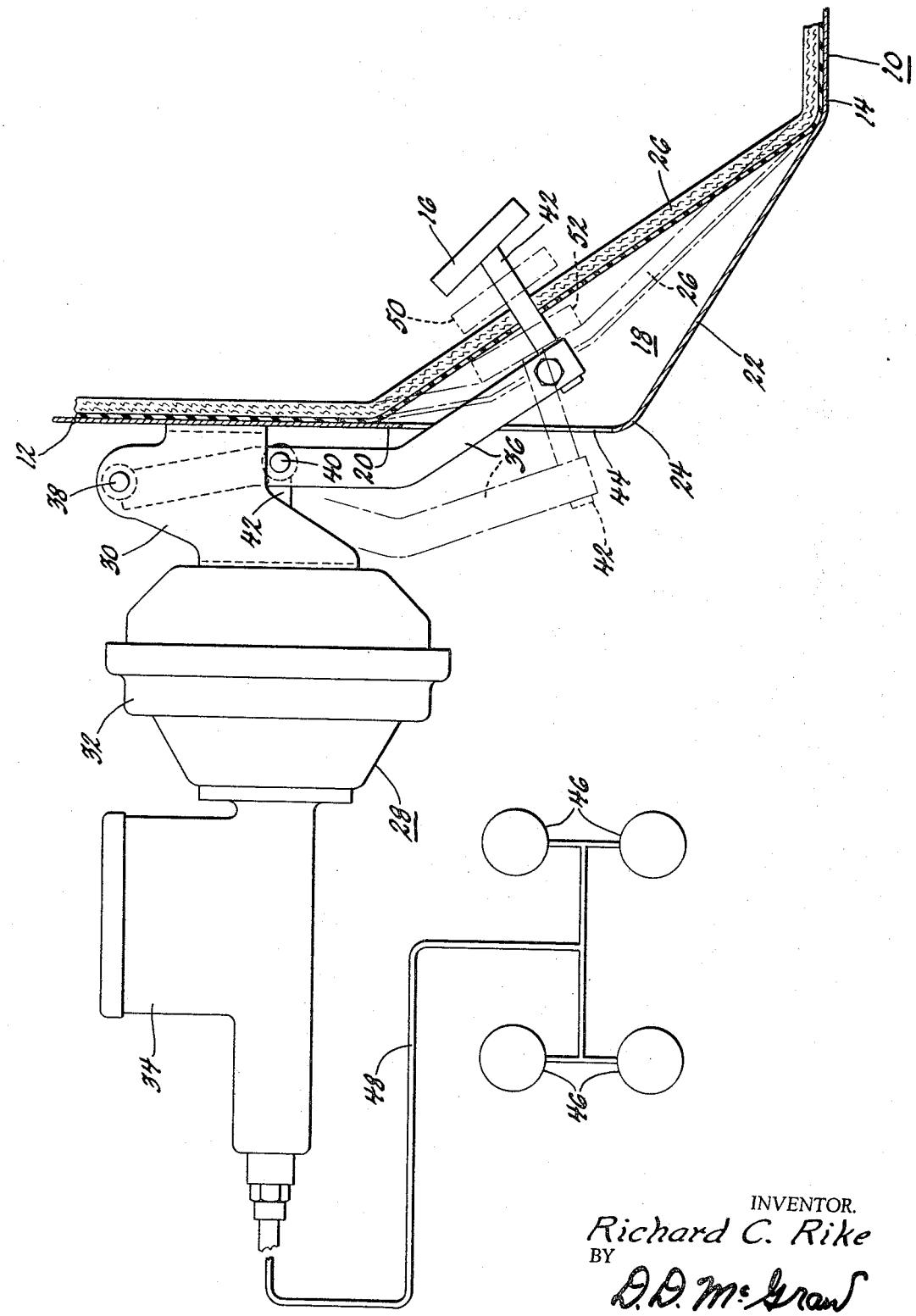
INVENTOR.
Richard C. Rike
BY
D.D. McGraw
HIS ATTORNEY United States Patent Office 3,327,804
Patented June 27, 1967

3,327,804
VEHICLE BRAKE ACTUATING ASSEMBLY AND FLOORBOARD ARRANGEMENT
Richard C. Rike, Dayton, Ohio, assignor to General Motors Corporation, Detroit, Mich., a corporation of Delaware
Filed Oct. 11, 1965, Ser. No. 494,351
6 Claims. (Cl. 180—90.6)

The invention relates to a construction for use in a vehicle, and more particularly to one in which the vehicle toeboard area adjacent the brake pedal permits movement of the brake pedal below the plane of the toeboard under some conditions of operation while maintaining the toeboard planar relationship when the brake pedal is not required to go below the plane thereof.

In vehicles having brake pedals operating the vehicle braking system, the brake pedal normally moves through a range of travel above a toeboard. Normal brake pedal operation may require, for example, about two inches of brake pedal travel, with occasional greater travel requirements due to heavy brake usage. This may occur when the brakes are overheated and fade, therefore requiring a greater master cylinder output displacement to obtain the necessary braking effort. This is accomplished by pushing the brake pedal through a greater stroke. In such installations the brake pedal could be positioned about two inches above the plane of the toeboard, while utilizing the invention to permit further travel when necessary.

It is also often desirable to position the brake pedal very close to the toeboard. Many brake systems permitting this arrangement have been proposed, usually utilizing a brake actuating mechanism which requires the brake pedal to travel in a very limited range of movement. Such brakes are known as zero travel or minimum travel systems. They usually utilize an outside source of power such as vacuum or pressurized fluid in conjunction with a brake booster mechanism so that the relatively small amount of brake pedal movement is transformed into a full range of brake actuating pressure. Such brake systems require relatively small operating forces. However, when the brake system power fails for some reason, it is desirable to be able to manually operate the vehicle brakes through the same brake pedal. In order to obtain the necessary force under these conditions, a greater brake pedal stroke or range of movement is usually provided. When a vehicle with a solid floorboard and toeboard construction has such a brake pedal therein, the pedal must be either positioned well away from the toeboard to permit such movement, or a pedal lifting device must be provided so that the pedal is in a low position during power operation but is raised for manual operation. The first of these arrangements is unsatisfactory since the pedal extends into the passenger compartment to an undesirable extent and is not convenient for operation. The second arrangement works satisfactorily, but is more expensive and complicated. For this reason it has been proposed in the past to utilize large brake pedals or treads simulating a portion of a toeboard so that the brake pedal is actually a major portion of the entire toeboard area. The upper portions of such pedal-toeboard mechanisms are usually left open at the top, and the pedal-toeboard brake actuator presents a discontinuous appearance. Other proposals have included the use of a zero travel brake pedal pressure pad arrangement substantially flush with the toeboard. However, such systems do not permit manual brake operation when the power system fails.

It is now proposed to utilize a vehicle construction in which the brake actuating assembly is mounted on the forward side of the firewall in a compartment forward of the passenger compartment. This assembly may be a manually operated master cylinder and brake pedal, or may include a brake booster. This compartment is usually the engine compartment of the vehicle. The brake pedal arm extends downwardly forward of the firewall and through an aperture formed in a toeboard portion of the vehicle floorboard and then rearwardly and upwardly so that it is in a position to be actuated by the vehicle operator. The toeboard section of the floorboard is preferably planar and joins the firewall and the flat potrion of the floorboard rearwardly of the control pedal area. The portion of the toeboard adjacent and underneath the brake pedal and through which the pedal arm extends is formed of a resiliently stretchable material, which may be a type of carpeting, and is normally positioned in the plane of the toeboard section. When the brake pedal is normally operated, the pedal range of movement is above the plane of the toeboard section. However, if for any reason such as power failure, booster runout, or brake fade, the range of movement of the pedal is required to go below the plane of the toeboard, the resiliently stretchable material yields as the pedal is pressed downwardly so that the pedal may extend the necessary extent below the plane of the toeboard section to obtain adequate brake operation. When the pedal is released and returns to its normal released position, the resiliently stretchable material also returns to the plane of the toeboard section. It is a feature of the invention to also provide a depresison in the portion of the floorboard joining the substantially horizontal portion of the floorboard and the firewall and into which the brake pedal may move when moving below the plane of the toeboard section. Thus the resiliently stretchable material is depressed into this floorboard depression. A suitable aperture in the floorboard in a portion thereof defining the depression receives the brake pedal arm therethrough. The resiliently stretchable material preferably acts as a seal around the pedal arm. Since the part of the pedal arm to which the pedal is attached follows an arcuate movement which may be considered to be generally linear, the resiliently stretchable material will not be unduly deformed while maintaining its sealing position. It therefore prevents the entry of dust, dirt, water and other such foreign matter into the passenger compartment through the depression aperture provided for the brake pedal arm. The pedal arm may also be provided with a suitable flexible seal covering the aperture. In some installations the floorboard aperture may be obtained by removing a portion of the floorboard metal instead of providing a depression.

The brake actuating assembly and floorboard arrangement permits the use of a brake actuating assembly which may be preassembled and easily mounted on the firewall as a unit. The only portion of the brake actuation assembly which extends into the passenger compartment is the brake pedal and the pedal arm post section which connects to the pivoted portion of the pedal arm. Thus a simplified assembly arrangement is provided.

In the drawing:

The figure is a partial section view with parts broken away showing a brake actuating assembly and vehicle floorboard arrangement embodying the invention.

The vehicle in which the arrangement is installed is illustrated in the drawing as including a floorboard 10 having a firewall section 12, a generally horizontal section 14 and a toeboard section joining the firewall and horizontal floorboard sections. The toeboard section is generally planar. However, in the area underneath the brake pedal 16, a depression 18 is formed in the toeboard section and, as seen in cross section, is defined by a floorboard portion 20 which is an extension of the firewall section 12 and another floorboard portion 22 which is a slightly upward extending extension of the horizontal floorboard section 14. Floorboard portions 20 and 22 meet at the joint or bend 24. In actual practice these floorboard sections and portions are formed of sheet metal which is stamped or drawn to the proper shape. The portion of the floorboard which is not depressed and forms the planar toeboard section lies in a plane which as seen in the figure is at the bottom side of the resiliently stretchable material 26 covering the depression 18. The resiliently stretchable material may be a suitable type of carpeting with which the entire floorboard of the passenger compartment is covered. Due to the depression 18, the resiliently stretchable material 26 is not supported in the area adjacent the brake pedal 16 other than by its own elasticity. The provision of the depression 18 is a preferred embodiment; however, an aperture through the floorboard may be provided by removing floorboard portions 20 and 22.

A brake actuating assembly 28 is mounted on the forward side of the firewall 12 and includes a mounting bracket 30, a booster mechanism 32, a master cylinder 34 and a brake pedal arm 36. The brake pedal arm is pivoted at 38 to the bracket 30 and at 40 to the push rod 42 by which the booster and master cylinder are actuated. The brake pedal arm 26 has a pedal arm post 42 removably secured to the lower end thereof and extending upwardly through an aperture formed in the resiliently stretchable material 26 and providing a mount for the brake pedal 16. The resiliently stretchable material 26 may be suitably sealed about post 42 to permit relative movement of the post therein while substantially preventing the passage of foreign matter. An aperture 44 is formed in the floorboard portion 20 so that the pedal arm 36 can extend into and through the depression 18, thereby providing an access between the passenger compartment and the compartment in which the brake actuating assembly 28 is mounted.

The brake pedal is shown in solid lines in the figure in the brake released position so that the wheel brakes 46, connected by brake line 48 to master cylinder 34, are not pressurized. During normal operation of the brake actuating assembly, the brake booster 32 is provided with a suitable source of power such as vaccum or presurized fluid, so that the brake pedal 16 is required to move in a range of movement which terminates in the normal full brake apply position 50, shown in dashed lines. A similar range of movement may be provided for a non-boosted system. This position is above the plane of the planar toeboard section and therefore above the resiliently stretchable material 26. Thus in the normal mode of operation of the brake actuating assembly the pedal 16 does not engage the resiliently stretchable material 26. However, if the brake actuating assembly must receive either additional or all of its power from manual actuation through the brake pedal, or due to brake fade additional master cylinder pressure must be generated, a greater brake pedal stroke must be provided. Therefore, for full brake apply under such conditions, the brake pedal 16 may move to the position 52, which is below the plane of the planar toeboard section and within the depression 18. Thus the pedal 16 moves through the plane of the resiliently stretchable material 26, engaging that material and depressing it into the depression, as shown in the drawing by dashed lines. When the brake pedal is released, it returns to the released position shown in full lines and the material 26 also returns to its released position, shown in full lines.

A brake actuating assembly and floorboard arrangement is therefore provided which permits relatively low positioning of the brake pedal in relation to a toeboard during normal operation of the actuating assembly and permits the brake pedal to be depressed below the plane of the toeboard when additional pedal stroke is necessitated. The arrangement provides for simple assembly of the brake acuating assembly to the firewall of the vehicle and at the same time presents a pleasing appearance from the passenger compartment side. All of the brake actuating mechanism except the brake pedal and the post on which it is mounted is retained forward of the planar toeboard section and the vehicle firewall.

What is claimed is:
1. In a vehicle,
   a floorboard having a planar toeboard section and a brake pedal receiving depression depending from and positioned below at least a portion of said planar toeboard section,
   a brake pedal mounted on a brake pedal arm extending through said planar toeboard section and operable in a normal mode through a range of movement above said planar toeboard section and in another mode through a greater range of movement extending through and below the plane of said planar toeboard section and into said depression, and
   the portion of said planar toeboard section above said depression being resiliently stretchable means movable with said pedal when said pedal is moved into said depression and maintaining the form of the planar toeboard section when said pedal is above said section.

2. The construction defined by claim 1, said floorboard including a generally vertical firewall section and said depression being formed with an upper surface which is a planar extension of said firewall and a lower surface angularly joined therewith so that the deepest portion of said depression formed by the angular joint thereof is located substantially in the line of movement of said pedal.

3. The construction defined by claim 1, said floorboard having a brake pedal arm-receiving aperture therein in the portion forming said depression, said resiliently stretchable means operating as a seal with said pedal arm for preventing the introduction of foreign matter in the vehicle passenger compartment through said aperture.

4. The construction defined by claim 1, said floorboard including a generally vertical firewall at the upper portion of said toeboard section, and a brake actuator assembly having said brake pedal arm pivotally secured thereto and mounted entirely on the side of said firewall opposite said brake pedal.

5. A vehicle having a firewall and a toeboard separating a passenger compartment and a second compartment, a brake system actuator assembly mounted on said firewall entirely within said second compartment and having a brake pedal and arm extending through said toeboard into said passenger compartment, the portion of said toeboard through which said pedal and arm extends being a resiliently stretchable material permitting said brake pedal to be depressed below the normal position of said toeboard.

6. The construction of claim 5, said resiliently stretchable material being a carpet-like floorboard cover covering a passenger foot section of said passenger compartment.

References Cited

UNITED STATES PATENTS

| 1,982,515 | 11/1934 | Hodes. | |
| 2,860,720 | 11/1958 | Huff et al. | 180—90.6 |
| 3,108,651 | 10/1963 | Miller | 180—90.6 |
| 3,288,239 | 11/1966 | Ristau | 180—90.6 X |

KENNETH H. BETTS, *Primary Examiner.*